(12) United States Patent
Huep et al.

(10) Patent No.: US 6,266,628 B1
(45) Date of Patent: Jul. 24, 2001

(54) SURVEYING SYSTEM WITH AN INERTIAL MEASURING DEVICE

(75) Inventors: Wolfgang Huep, Oberkochen; Ernst Michelbacher, Königsbronn, both of (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/191,320

(22) Filed: Nov. 13, 1998

(30) Foreign Application Priority Data

Nov. 13, 1997 (DE) .............................................. 197 50 207

(51) Int. Cl.[7] .................................................. G01C 17/00
(52) U.S. Cl. .............................. 702/150; 702/94; 33/290; 33/293
(58) Field of Search ............................ 702/94, 150, 166; 33/290, 291, 293; 701/207, 220, 221

(56) References Cited

U.S. PATENT DOCUMENTS

| 4,171,907 | | 10/1979 | Hill et al. . | |
|---|---|---|---|---|
| 4,302,885 | | 12/1981 | Levine et al. . | |
| 4,490,919 | * | 1/1985 | Feist et al. | 33/293 |
| 5,313,409 | * | 5/1994 | Wiklund et al. | 33/290 |
| 5,568,152 | * | 10/1996 | Janky et al. | 342/357.08 |
| 5,671,160 | * | 9/1997 | Julian | 702/150 |
| 5,956,660 | * | 9/1999 | Neumann | 702/94 |

FOREIGN PATENT DOCUMENTS

| 31 39 239 A1 | 5/1982 | (DE) | G01C/3/30 |
|---|---|---|---|
| 0 481 307 A2 | 4/1991 | (EP) | G01S/5/14 |

* cited by examiner

Primary Examiner—Kamini Shah
Assistant Examiner—Bryan Bui

(57) ABSTRACT

A surveying system has a sighting device and a position measuring unit. The position measuring unit includes an inertial measuring device.

17 Claims, 1 Drawing Sheet

SURVEYING SYSTEM WITH AN INERTIAL MEASURING DEVICE

BACKGROUND OF THE INVENTION

1. Field of the Invention

The invention relates to a surveying system and, more particularly, to a surveying system having a sighting device and a position measuring unit, and also to surveying process using such a surveying system.

2. Description of Relevant Art

A surveying system of the given category is known, for example, from European Patent EP 0 481 307 A2. This document discloses a tachymeter with a GPS (Global Positioning System) position measuring unit; that is, a satellite-based position measuring unit, wherein both the sighting device, i.e., the tachymeter proper, and also the reflector rod to be sighted with the tachymeter, are equipped with a satellite-based position measuring device.

However, the satellite-based position measuring unit requires free lines of sight to at least four satellites. Thus the use of the satellite-based position measuring unit is limited or impossible between houses, in surveying from corners of houses, under trees, under bridges, in ravines, and in buildings.

SUMMARY OF THE INVENTION

The invention therefore has as its object to provide a surveying system of the given category, which makes reliable surveying results possible even in difficult surveying situations.

This object is attained by a surveying system with a sighting system, in that the surveying system includes a position measuring system constructed as an inertial measuring device.

An inertial measuring device can include acceleration sensors and/or a gyro and preferably respectively three acceleration sensors and three gyros, and can provide both information concerning the orientation in space and also information concerning the difference of coordinates between start point and end point of a displacement of the inertial measuring device.

By means of the invention, the position values determined by the sighting device can be secured and/or supplemented by the inertial measuring device, without the prerequisite of a free visual connection to at least four satellites.

When the surveying system includes a target point carrier which is to be sighted by the sighting device and is movable relative to the sighting direction, and the inertial measuring device is arranged on the target point carrier, the surveying system can also determine the position of the target point carrier even when the visual connection between the sighting device and the target point carrier is interrupted. In a further embodiment, the sighting device includes a target point carrier seeking device which seeks the target point carrier in an automated manner by means of the measurement values which are supplied by the inertial measuring device arranged on the target point carrier. The time for sighting the target point carrier can thereby be considerably shortened.

In a further embodiment, the target point carrier includes a transmitter unit which transmits measurement values which are determined by the inertial measuring device to an evaluation unit of the surveying system.

Thus the measurement values determined by the inertial measuring device can be processed contemporaneously with the angle and distance values determined by the sighting device, so that the known drift problems of inertial measuring devices can be corrected by comparison with the measurement values of the sighting device.

However, the target point carrier can also include a measurement value memory which stores the measurement values determined by the inertial measuring device. In this variant, the measurement values determined by the sighting device and the inertially determined measurement values are compared at the end of a survey section, wherein it is not even necessary that a radio connection between the target point carrier and the sighting device exists.

In a further group of embodiments, the inertial measuring device is arranged on the sighting device. The orientation data determined by graduated circle measurements with a theodolite or tachymeter can thus also be supplied to the sighting device by means of the inertial measuring device. Here it is not necessarily required that the target point be arranged on a target point carrier.

In this variant embodiment, the position of the sighting device within a survey section can be displaced with a view to better visibility of the target point, the differences of coordinates and angles from the previous position being supplied by the inertial measuring device.

When the sighting device and the inertial measuring device are combined in a freehand unit, the support of the surveying system on a massive stand or pillar can be dispensed with. Thus a highly mobile surveying system is made possible by the invention and, for example, can be handled like field-glasses.

When, in a surveying system with a target point carrier, both the sighting device and also the target point carrier have an inertial measuring device, the advantages stated hereinabove can be combined.

The well-established surveying systems can be further improved if the sighting device is the measuring telescope of a theodolite or a tachymeter and, for example, the target point carrier includes a reflector.

The invention also has as further objects surveying processes that are made possible by the surveying system according to the invention.

BRIEF DESCRIPTION OF THE DRAWINGS

The invention is described hereinbelow by means of preferred embodiments with reference to the accompanying drawings, in which.

DETAIL DESCRIPTION OF THE PREFERRED EMBODIMENTS

Figure 1:
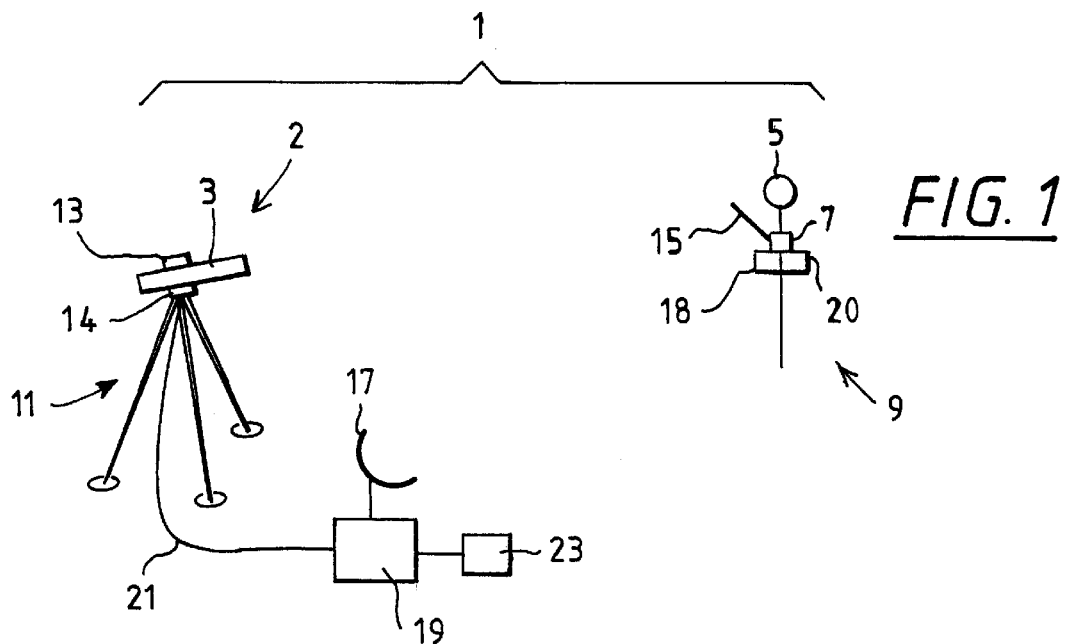
FIG. 1 shows a schematic diagram of an embodiment of the surveying system according to the invention.

In FIG. 1, a surveying system 1 according to the invention is shown schematically. The surveying system 1 includes a sighting device 2 with a telescope 3, with which a target point 5 is sighted, in order to be able to measure the angular position and the distance of the target point 5 in relation to the sighting device 2. The target point 5, constructed as a reflector, is arranged together with an inertial measuring device 7 on a rod-shaped target point carrier 9.

The measuring telescope 3 is arranged to be rotatable around a vertical axis, and pivotable around a horizontal axis, gimbal-mounted on a stand 11, and includes a distance measuring device 13 which measures the distance to the target point 5, so that the position of the target point can be determined when the position of the measuring telescope is known.

Measurement values supplied from the inertial measuring device 7 when the target point 5 is displaced are transmitted to an evaluation unit 19 by means of a transmitting antenna 15 associated with the inertial measuring device 7 and a receiving antenna 17 of the evaluation unit 19 of the surveying system 1. The evaluation unit 19 is also connected via a data lead 21 to the sighting device 2. Angle and/or distance data determined by the sighting device 2 can be transmitted via the data lead 21 to the evaluation unit 19.

The sighting device 2 also has a target point carrier seeking device 14 which uses the signals of the inertial measuring device 7 received by the evaluation unit 19 in order to align the measuring telescope 3 onto the target point carrier 9.

The evaluation unit 19 could of course also be arranged directly on the sighting device 2 or at the target point 5, where the latter alternative requires a radio connection between the sighting device 2 and the evaluation unit.

A measured value memory 18 and an indicating unit 20 are associated with the inertial measuring device 7 and are arranged at the target point carrier 9. The measurement values supplied by the inertial measuring device 7, and if necessary further data, e.g., predetermined positions for a survey, can be stored in the measured value memory 18; these data are indicated to the operator of the target point carrier 9 by the indicating unit 20.

Furthermore, the evaluation unit 19 has an indicating and operating device 23, by means of which the survey results can be indicated and the surveying system 1 can be operated.

Figure 2:
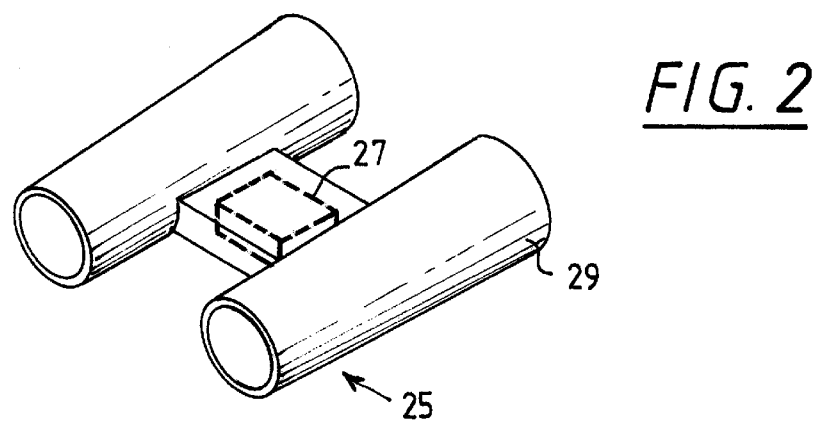
FIG. 2 shows a schematic diagram of a further embodiment of the surveying system according to the invention.

A further surveying system 25 is shown in FIG. 2, and is constructed as a freehand theodolite or a freehand tachymeter. The sighting device of this surveying system 25 is constructed as field-glasses 29, and includes an inertial measuring device 27 which can measure the orientation of the field-glasses 29 with respect to an initial or null direction. This initial or null direction is itself established, for example, by sighting on a known distant point.

The surveying system 25 in its embodiment as a freehand tachymeter is furthermore equipped with an electronic rangefinder.

The surveying system 25 can be operated without a reflector, i.e., it can also be used in one-man operation without a target point carrier.

Here one or more target points can be measured from a given position of the surveying system 25, and the surveying system 25 can then be moved to a new position, from which other or even the same target points are measured.

The inertial measuring device 27 then supplies the position and angle coordinates of the sighting device 29 relative to the position and angle coordinates of the initial position.

Figure 3:
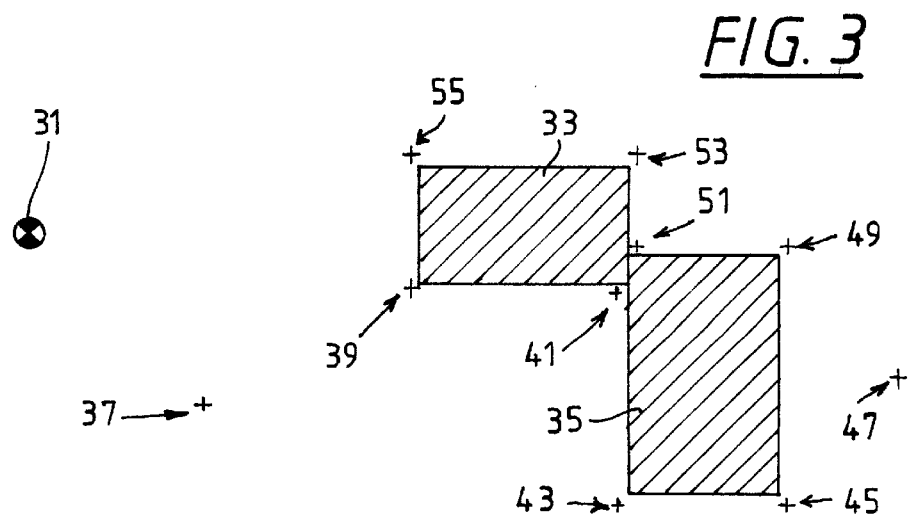
FIG. 3 shows a schematic diagram of a typical surveying problem that is soluble in a simple manner with the surveying system according to the invention.

A survey situation is sketched in FIG. 3 in which the position coordinates of given points are to be measured or received by means of a surveying system according to the invention, e.g., the surveying system 1 of FIG. 1.

Here the position of the sighting device is denoted by 31. 33 and 35 denote obstacles, e.g. buildings, which block the view. The surveying of the local point 37 takes place with a target point carrier arranged at 37 by means of a measurement of the angle and distance to the position 31 of the sighting device. When the target point carrier equipped with an inertial measuring device has been moved from the position 31 of the sighting device to the position 37, the inertial measuring device can supply further position and angle information.

The target point carrier is then brought to the next local point 39 to be surveyed or picked up. The position coordinates of the local point 39 can be determined, based on the visual connection between the sighting device and the local point 39, both tachymetrically with the sighting device and also inertially with the inertial measuring device.

The line of sight to the sighting device is interrupted at the next local point 41 to be surveyed. However, the local coordinates of this local point 41 can always still be determined with the inertial measuring device, without having to bring the sighting device, as was previously necessary, to a new position with a free line of sight to the local point 41. At the next measurement point 43, the position coordinates can be determined, based on the line of sight connection to the target point carrier which is now again present, both tachymetrically and also inertially, and hence with increased accuracy and/or reliability.

In contrast to this, a position coordinate determination at the succeeding measurement points 45, 47, 49, 51 and 53 is possible only be means of the inertial measuring device. A free line of sight from the sighting device to the target point carrier is again present at the next measurement point 55, so that an equalization of the inertial measurement values with the tachymetric measurement values is again possible.

The described measurement process is possible both with simultaneous transfer of the inertial measurement values to an evaluation unit arranged at the position 31 of the sighting device, and with storing of the inertial measurement values in a measurement value memory arranged at the target point carrier, its stored measurement values being first input into the evaluation unit at the end of the surveying process, i.e., when the target point carrier is again at the position 31.

A surveying process will also become apparent from FIG. 3, in which terrain is staked out, i.e., local points in the terrain, predetermined by coordinates, are searched for and marked.

Here the target point carrier is brought to the local points 37, 39, 43 and 45, under the control of the sighting device arranged at position 31 and under the control of the inertial measuring device arranged at the target point carrier. The search for the local points 41, 45, 47, 49, 51 and 53 without visual connection to the sighting device takes place only by means of the inertial measuring device, wherein the target point carrier has an indicating device for the operator of the target point carrier, to indicate to the operator the actual local coordinates and positions to be surveyed, as supplied by the inertial measuring device.

We claim:

1. A surveying process with the use of a surveying system having a sighting device, a position measuring unit that comprises a target point carrier that is movable relative to said sighting device and is sighted by said sighting device, and an inertial measuring device arranged on said target point carrier, comprising:

placing said target point carrier at an initial position, moving said target point carrier sting from said initial position to further positions that are to be surveyed, using measurement values supplied by said inertial measuring device for determining coordinates of said positions of said target point carrier, and when visual connection between said sighting device and said target point carrier is interrupted, measuring the position of said target point carrier exclusively by measurement values supplied by said inertial measuring device.

2. The surveying process according to claim 1, further comprising measuring the position of said target point carrier tachymetrically with said sighting device and with measurement values supplied from said inertial measuring device.

3. The surveying process according to claim 1, further comprising transmitting measurement values of said inertial measuring device by a transmitting unit associated with said target point carrier to an evaluation unit of said surveying system.

4. The surveying process according to claim 1, further comprising storing measurement values of said inertial measuring device in a measurement value memory associated with said target point carrier.

5. The surveying process with the use of a measuring system having a sighting device, and an inertial measuring device arranged on said sighting device, comprising:

placing said sighting device at an initial position, moving said sighting device to further positions, using measurement values for surveying supplied by said inertial measuring device that correspond to a path that said sighting device has covered planning positions to be measured in advance, and controlling transfer of said sighting device from said initial position to said further positions to be surveyed with said inertial measuring device.

6. A surveying process with the use of a surveying system having a sighting device, a position measuring unit that comprises a target point carrier that is movable relative to said sighting device and is sighted by said sighting device, and an inertial measuring device arranged on said target point carrier, comprising:

placing said target point carrier at an initial position, moving said target point carrier starting from said initial position to further positions that are to be surveyed, using measuring values supplied by said inertial measuring device for determining coordinates of said positions of said target point carrier, and when visual connection between said sighting device and said target point carrier is interrupted, measuring the position of said target point carrier exclusively by measurement values supplied by said inertial measuring device.

7. The surveying process according to claim 6, further comprising, when visual connection between said sighting device and said target point carrier is restored, comparing survey results obtained by said inertial measuring device with survey results obtained tachymetrically.

8. A surveying process with the use of a surveying system having a sighting device, a position measuring unit that comprises a target point carrier that is movable relative to said sighting device and is sighted by said sighting device, and an inertial measuring device arranged on said target point carrier, comprising:

placing said target point carrier at an initial position, moving said target point carrier starting from said initial position to further positions that are to be surveyed, using measurement values supplied by said inertial measuring device for determining coordinates of said positions of said target point carrier, planning positions to be measured in advance, and controlling transfer of said target point carrier from said initial position to said further positions to be surveyed with said inertial measuring device.

9. A surveying system, comprising:

a sighting device, a position measuring unit, comprising an inertial measuring device, a target point carrier that is movable relative to said sighting device and is sighted by said sighting device, said inertial measuring device being arranged on said target point carrier, and a target point carrier seeking device that makes use of measurement values supplied by said inertial measuring device for automatically seeking said target point carrier said sighting device including a measuring telescope, and said target point carrier seeking device providing automatic alignment of said measuring telescope onto said target carrier by using signals of said inertial measuring device.

10. The surveying system according to claim 9, further comprising an evaluation unit and a transmitting unit included in said target point carrier that transmits measurement values determined by said inertial measuring device to said evaluation unit.

11. The surveying system according to claim 9, further comprising a measurement value memory included in said target point carrier that stores measurement values determined by said inertial measuring device.

12. The surveying system according to claim 9, further comprising an indicating unit included with said target point carrier for indication of measurement values of said inertial measuring device and, in appropriate circumstances, predetermined coordinate values.

13. The surveying system according to claim 9, further comprising a reflector included with said target point carrier.

14. The surveying system according to claim 9, in which said inertial measuring device is arranged on said sighting device.

15. The surveying system according to claim 14, in which said sighting device and said inertial measuring device are combined in a freehand unit.

16. The surveying system according to claim 9, in which said sighting device and said target point carrier each includes an inertial measuring device.

17. The surveying system according to claim 9, in which said sighting device comprises a measurement telescope of a theodolite or of a tachymeter.

* * * * *